United States Patent [19]
Rossin

[11] Patent Number: 5,777,625
[45] Date of Patent: Jul. 7, 1998

[54] CLIPPER RE-USES STORAGE LOCATIONS ALLOCATED FOR VERTICLES

[75] Inventor: Theodore G. Rossin, Fort Collins, Colo.

[73] Assignee: Hewlett-Packard Company, Palo Alto, Calif.

[21] Appl. No.: 623,566

[22] Filed: Mar. 28, 1996

[51] Int. Cl.$^6$ .................................................. G06T 15/00
[52] U.S. Cl. ............................................................ 345/434
[58] Field of Search ........................... 395/119–122, 133, 395/134; 345/419–422, 433, 434

[56] References Cited

U.S. PATENT DOCUMENTS 5,613,052  3/1997  Narayanaswami ...................... 395/120

OTHER PUBLICATIONS

Sutherland et al. "Reentrant Polygon Clipping" ACM 1974.

*Primary Examiner*—Almis R. Jankus
*Attorney, Agent, or Firm*—Edward L. Miller

[57] ABSTRACT

A triangle primitive to be clipped against a viewing volume is clipped six times; once against each plane of the viewing volume. During each such clipping operation phantom vertices are discovered and the hardware vertex locations they occupy are made available for re-use. The discovery of phantom vertices is accomplished by three rules. Rule #1 is: If a previous vertex in the vertex list is outside the clip limits and is not the starting vertex, then that previous vertex's location in the vertex list can be re-used. Rule #2 is: If the current vertex in the vertex list is outside the clip limits and is the starting vertex, then the location in the vertex list containing the data for that starting vertex can be re-used to contain the intersection of that last edge and the clipping plane. Rule #3 is: If the current vertex in the vertex list is outside the clip limits and there has already been an intersection between the clipping plane and another edge, then the locations in the vertex list containing the data for vertices from that current vertex and beyond can be re-used to contain any new vertices. These rules are implemented by various state machines that also control the clipper.

4 Claims, 18 Drawing Sheets

| CLIP CODES | | | | | | |
|---|---|---|---|---|---|---|
| | $Z_{MIN}$ | $Z_{MAX}$ | $X_{MIN}$ | $X_{MAX}$ | $Y_{MIN}$ | $Y_{MAX}$ |
| $V_0$ | 0 | 1 | 0 | 0 | 1 | 0 |
| $V_1$ | 0 | 0 | 1 | 0 | 0 | 0 |
| $V_2$ | 1 | 0 | 0 | 0 | 0 | 1 |
| $V_3$ | 0 | 0 | 0 | 0 | 0 | 1 |
| $V_4$ | 0 | 0 | 0 | 1 | 0 | 0 |

FIG. 5

FIXED VERTEX ALLOCATION FOR REGISTER COLLECTIONS
AT "LOCATIONS" 0-8

ORDER OF APPLYING CLIPPING PLANES →

| | INPUT LIST | $Z_{MIN}$ | $Z_{MAX}$ | $X_{MIN}$ | $X_{MAX}$ | $Y_{MIN}$ | $Y_{MAX}$ |
|---|---|---|---|---|---|---|---|
| $V_0$ | 0 | 0 | 4 | 4 | 4 | 4 | 4 |
| $V_1$ | 1 | 1 | 1 | 5 | 5 | 5 | 5 |
| $V_2$ | 2 | 3 | 3 | 1* | 1 | 1 | 1 |
| $V_3$ | | 2* | 2 | 3 | 3 | 3 | 8 |
| $V_4$ | | | 0‡ | 2 | 6 | 6 | 3* |
| $V_5$ | | | | 0 | 2* | 2 | 6 |
| $V_6$ | | | | | 0 | 7 | 2 |
| $V_7$ | | | | | | 0* | 7 |
| $V_8$ | | | | | | | 0 |

$V_1$ input list: 6

EACH OUTPUT LIST OF N VERTICES USES ONLY N LOCATIONS (0-(N-1))

FINAL OUTPUT LIST USES ONLY 9 LOCATIONS (0-8)

\* REGISTER COLLECTION AT THIS LOCATION RE-USED FOR ANOTHER VERTEX ACCORDING TO RULE #1.

‡ REGISTER COLLECTION AT THIS LOCATION RE-USED FOR ANOTHER VERTEX ACCORDING TO RULE #2.

FIG. 7

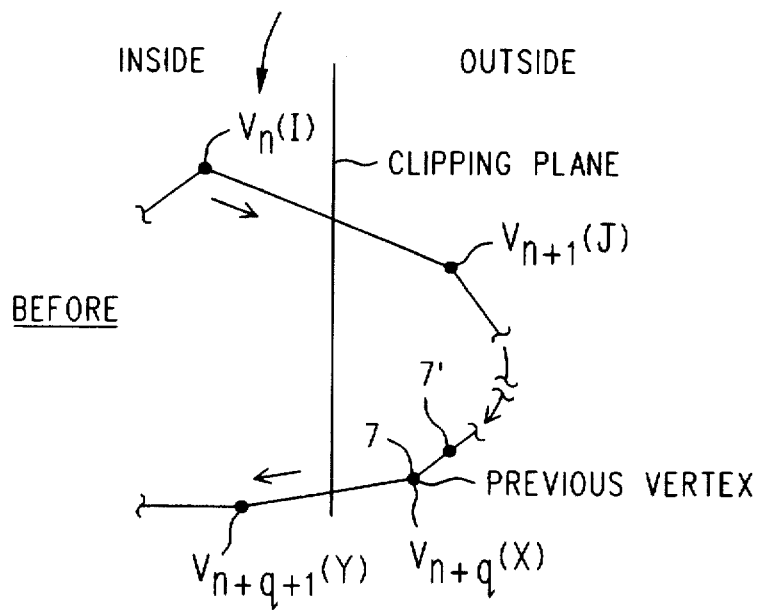
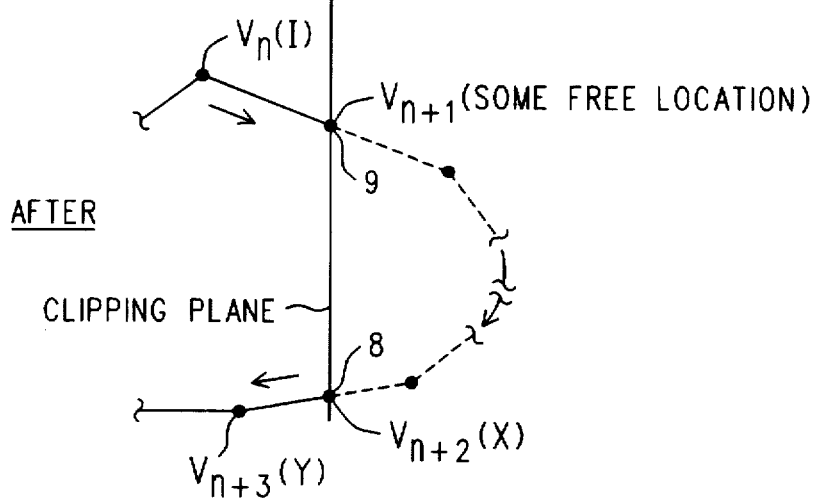
FIG. 8

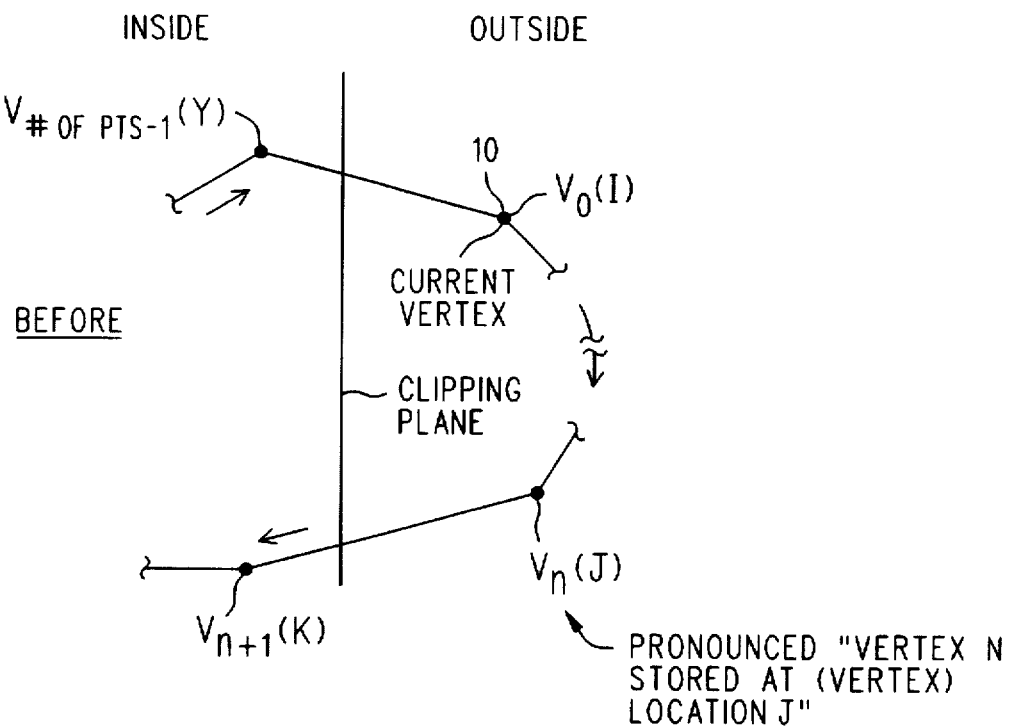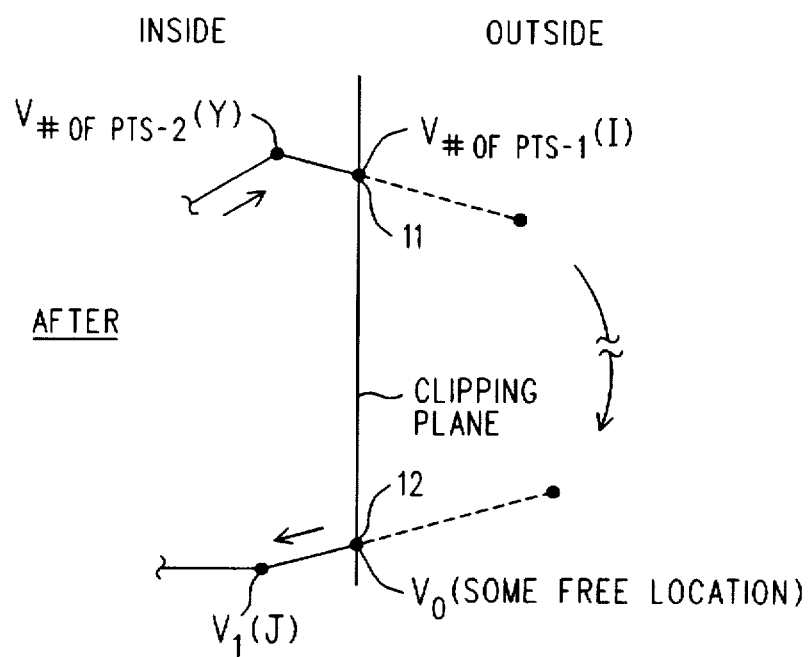
FIG. 9

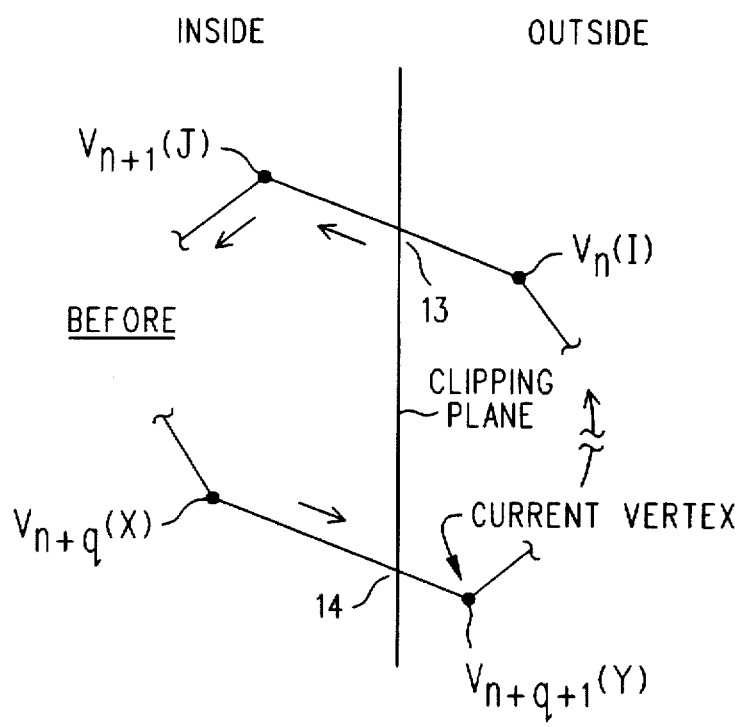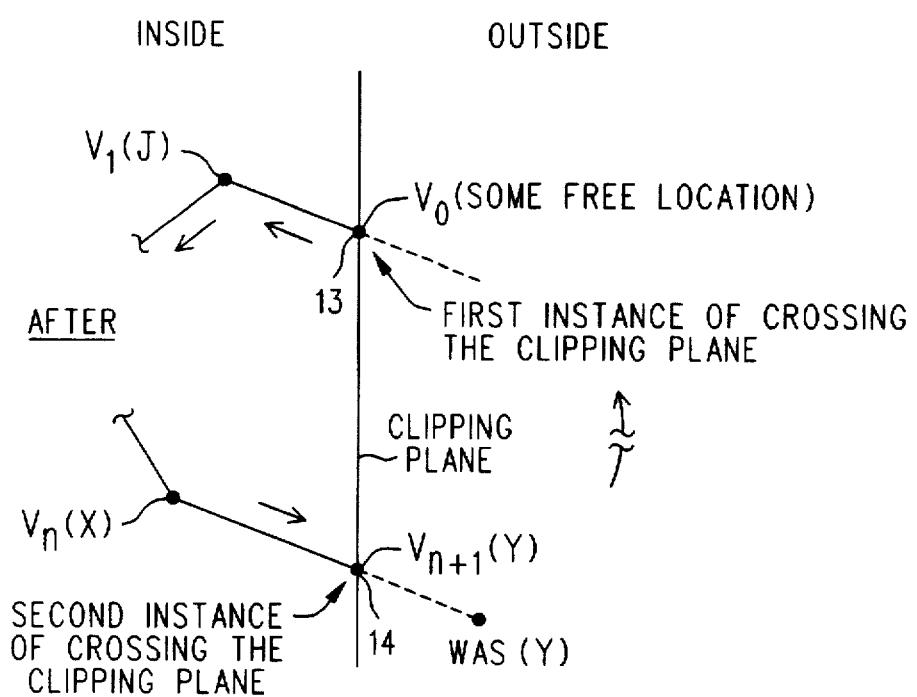
FIG. 10

VERTEX CLEAN UP FLOW DIAGRAM

CLIPPER RE-USES STORAGE LOCATIONS ALLOCATED FOR VERTICLES

BACKGROUND OF THE INVENTION

A high performance computer graphics system includes hardware that clips primitive shapes such as lines, planes and triangles, against other planes and the surfaces of rectangular solids. In particular, it is common to clip an object to be displayed against a viewing volume. Performing such clipping in hardware is much faster that doing it in software.

Objects in such a graphics system are described as a collection of primitives, which in turn are described as a collection of vertices. Each vertex is more than simply a triple of spatial coordinates plus a triple of primary colors, however, as in a modern graphics system a point may have many other properties, such as transparency, texture, fog, and other such information. In fact, it is not uncommon for each vertex of a primitive to have as many as sixteen floating point numbers per full set of coordinates describing that point. This means that whatever mechanisms manipulate a list of vertices describing a primitive must really be prepared to allocate sixteen floating point registers for every vertex involved or produced by the operation. It can be shown that the clipping of a triangle against a cube can produce a remnant with as many as nine vertices. Either an extreme zoom-in or a very large initial primitive can cause this situation. The brute force prior art method of clipping requires the retention of intermediate phantom vertices which are produced by clipping against one clipping plane but are later clipped away by another. These intermediate phantom vertices can raise the total number of register sets to fifteen. That is six register sets, or perhaps ninety-six (6×16) additional floating point registers. It would be desirable if the need for registers to represent phantom vertices could be avoided, thereby allowing smaller and less expensive hardware.

SUMMARY OF THE INVENTION

A triangle primitive to be clipped against a viewing volume is clipped six times; once against each plane of the viewing volume. During each such clipping operation phantom vertices are discovered and the vertex locations (register collections) they occupy are made available for re-use. The discovery of phantom vertices is accomplished by the implementation of three rules. These rules concern events or conditions that occur as the sides of the triangle/resulting remnant are taken in order while finding intersections with the present clipping plane. Rule #1 is: If a previous vertex in the vertex list is outside the clip limits and is not the starting vertex, then that previous vertex's (physical) vertex location in the vertex list can be re-used. Rule #2 is: If the current vertex in the vertex list is outside the clip limits and is the starting vertex, [i.e., we are clipping the last edge and the starting vertex is outside], then the (physical) vertex location in the vertex list containing the data for that starting vertex can be re-used to contain the intersection of that last edge and the clipping plane. Rule #3 is: If the current vertex in the vertex list is outside the clip limits and there has already been an intersection between the clipping plane and another edge, [i.e., the current vertex and all subsequent vertices are outside and will be clipped away], then the (physical) vertex locations in the vertex list containing the data for vertices from that current vertex and beyond can be re-used to contain any new vertices. These rules are implemented by various state machines that also control the clipper.

BRIEF DESCRIPTION OF THE DRAWINGS

FIG. 5 is a table of clip codes associated with the example remnant of FIGS. 1–4;

FIG. 7 is a diagram illustrating a preferred method of storing vertex information in registers during the clipping operation that produces the remnant of FIGS. 3 and 4;

FIG. 8 is a diagram illustrating a Rule #1 that is used to identify phantom vertices whose vertex locations can be re-used;

FIG. 9 is a diagram illustrating a Rule #2 that is used to identify phantom vertices whose vertex locations can be re-used;

FIG. 10 is a diagram illustrating a Rule #3 that is used to identify phantom vertices whose vertex locations can be re-used;

DESCRIPTION OF A PREFERRED EMBODIMENT

Figure 1:
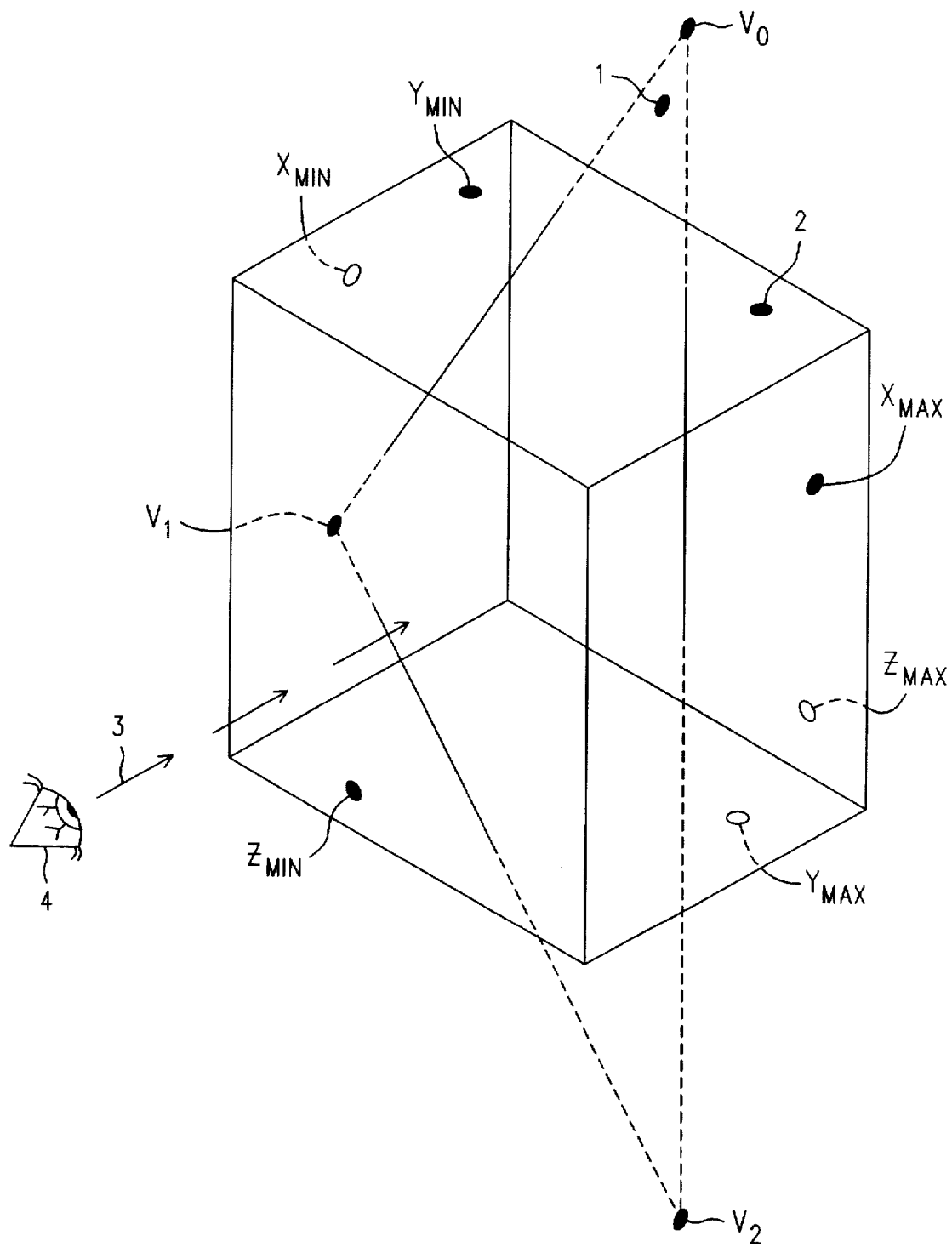
FIG. 1 is a perspective view of a triangle primitive intersecting a cubical viewing volume against which the triangle primitive is to be clipped.

Refer now to FIG. 1, wherein is shown a perspective view of a triangle primitive 1 to be clipped against a (transparent) viewing volume 2. The triangle primitive 1 is formed by three vertices: $V_0$, $V_1$ and $V_2$. For convenience, the transparent viewing volume 2 is shown as being cubical, although it will be understood that the viewing volume 2 could just as easily be any rectangular shape. The six faces of the viewing volume 2 constitute clipping planes against which the triangle 1 is to be clipped. These planes are $Z_{MIN}$ (closest to the viewer), $Z_{MAX}$ (furthest from the viewer), $X_{MIN}$ (on the viewer's left), $X_{MAX}$ (on the viewer's right), $Y_{MIN}$ (on top) and $Y_{MAX}$ (on the bottom). The graphics system's customary point of view for a viewer 4 is further indicated by the arrows 3. That point of view is normal to and centered on $Z_{MIN}$. In FIG. 1 the reader's (i.e., your) point of view is approximately forty degrees counter-clockwise and elevated above that of viewer 4. The edges of the viewing, or clipping volume 2 that would be visible to the reader (if the clipping volume were an actual solid) are shown as solid lines, as are those lines of the triangle 1 that would also be visible by virtue of being within the viewing volume 2. The short dashed lines denote portions of the triangle 1 which are to be clipped away.

Our interest will be in a novel method of determining the shape (think "collection of vertices") of the remnant that obtains when triangle 1 is clipped according to the viewing volume 2. While any triangle could be clipped according to that method, the particular triangle 1 that has been selected for purposes of illustration has certain properties that make it interesting by invoking various rules of the method that are disclosed herein below. Those rules involve certain spatial relationships.

Figure 2A:
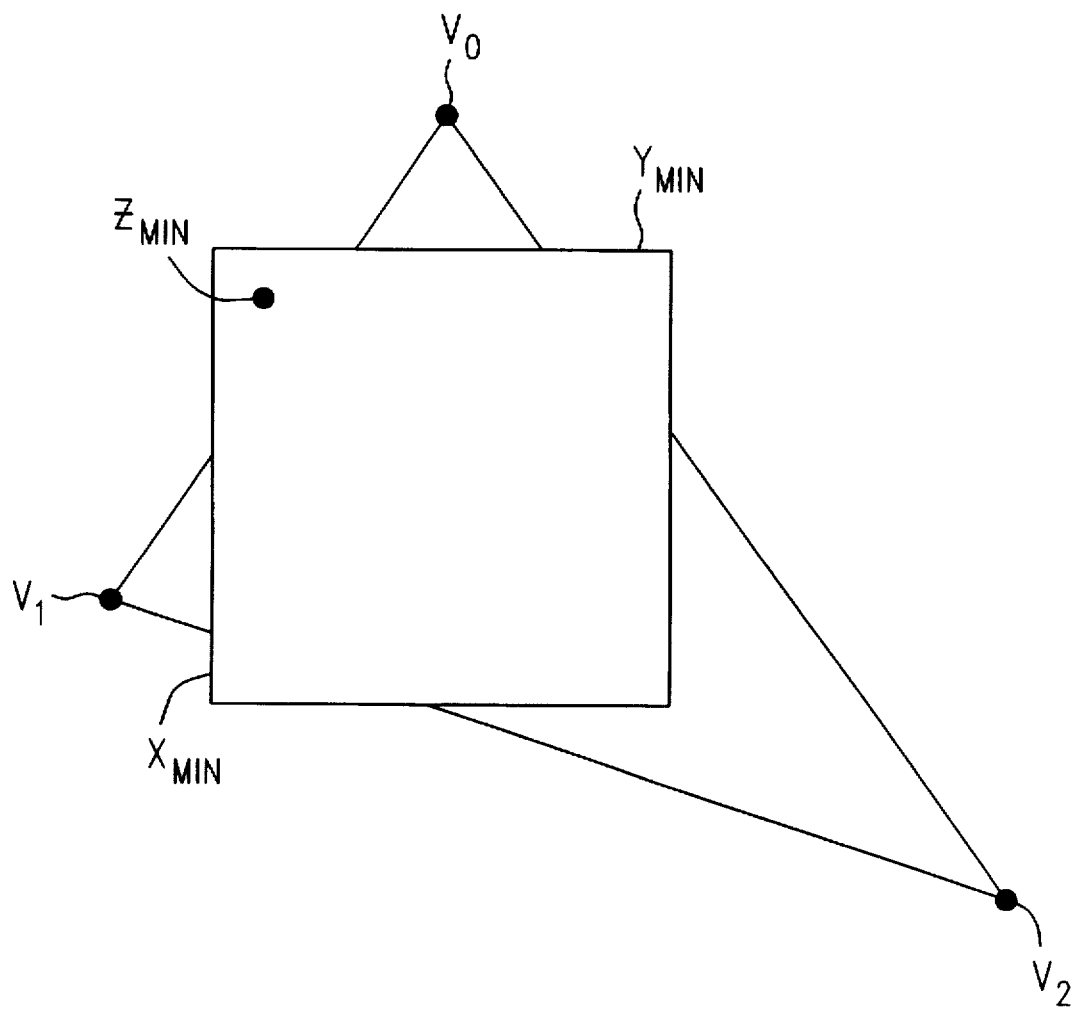
FIGS. 2A–C are respective front, top and side views of the triangle primitive and viewing volume of FIG. 1.
Figure 2B:
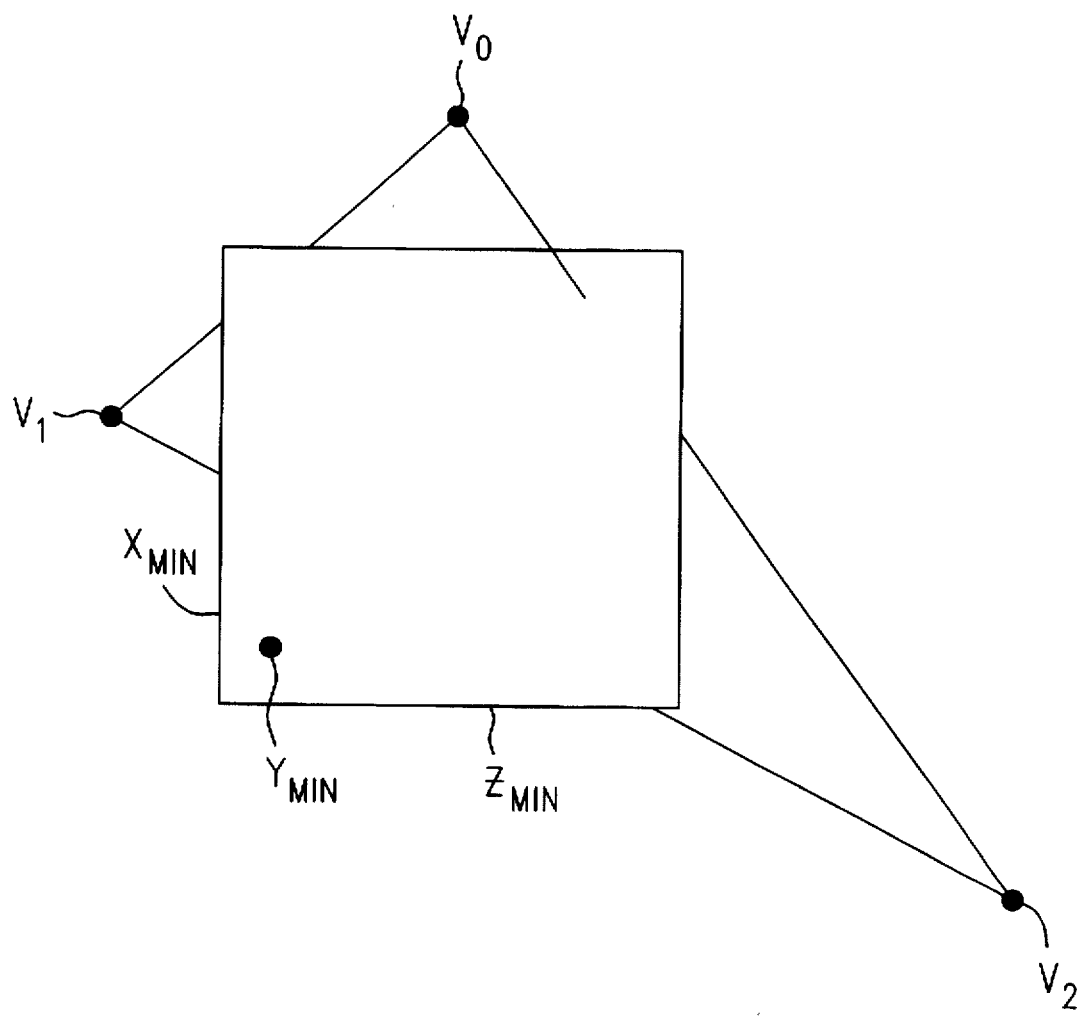
Figure 2C:
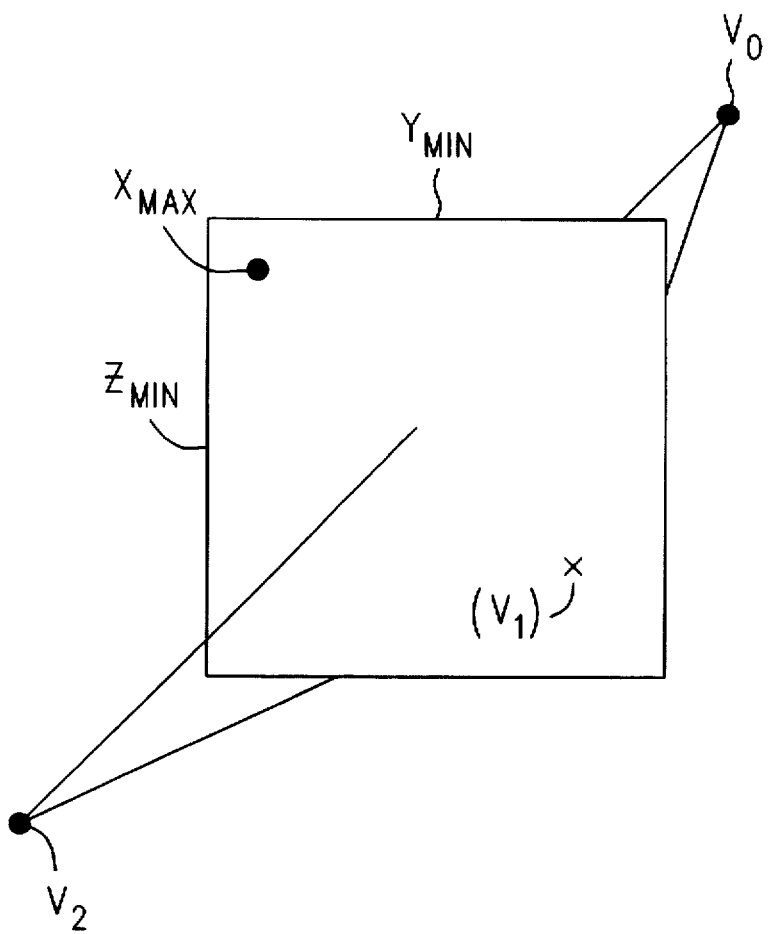

Accordingly, it will be useful for the reader to fully appreciate the spatial relationship between the viewing volume 2 and the triangle 1. Refer now to FIGS. 2A–C. which are traditional front, top and side views (i.e., viewer 4 in FIG. 1 sees the "front" view) of the triangle 1 and the clipping volume 2. What is to be gained from these figures is such relationships as "$V_0$ is above (less than) $Y_{MIN}$", "$V_2$ is below (greater than) $Y_{MAX}$", "$V_1$ is to the left of $X_{MIN}$ but within the confines of the extension of the four planes $Z_{MIN}$, $X_{MIN}$, $Z_{MAX}$ and $Y_{MAX}$", and so on. We do this because even a perspective drawing such as FIG. 1 does not unambiguously and reliably force the observer to conclude that $V_0$ is necessarily above $Y_{MIN}$, or that $V_2$ is below $Y_{MAX}$.

Figure 3:
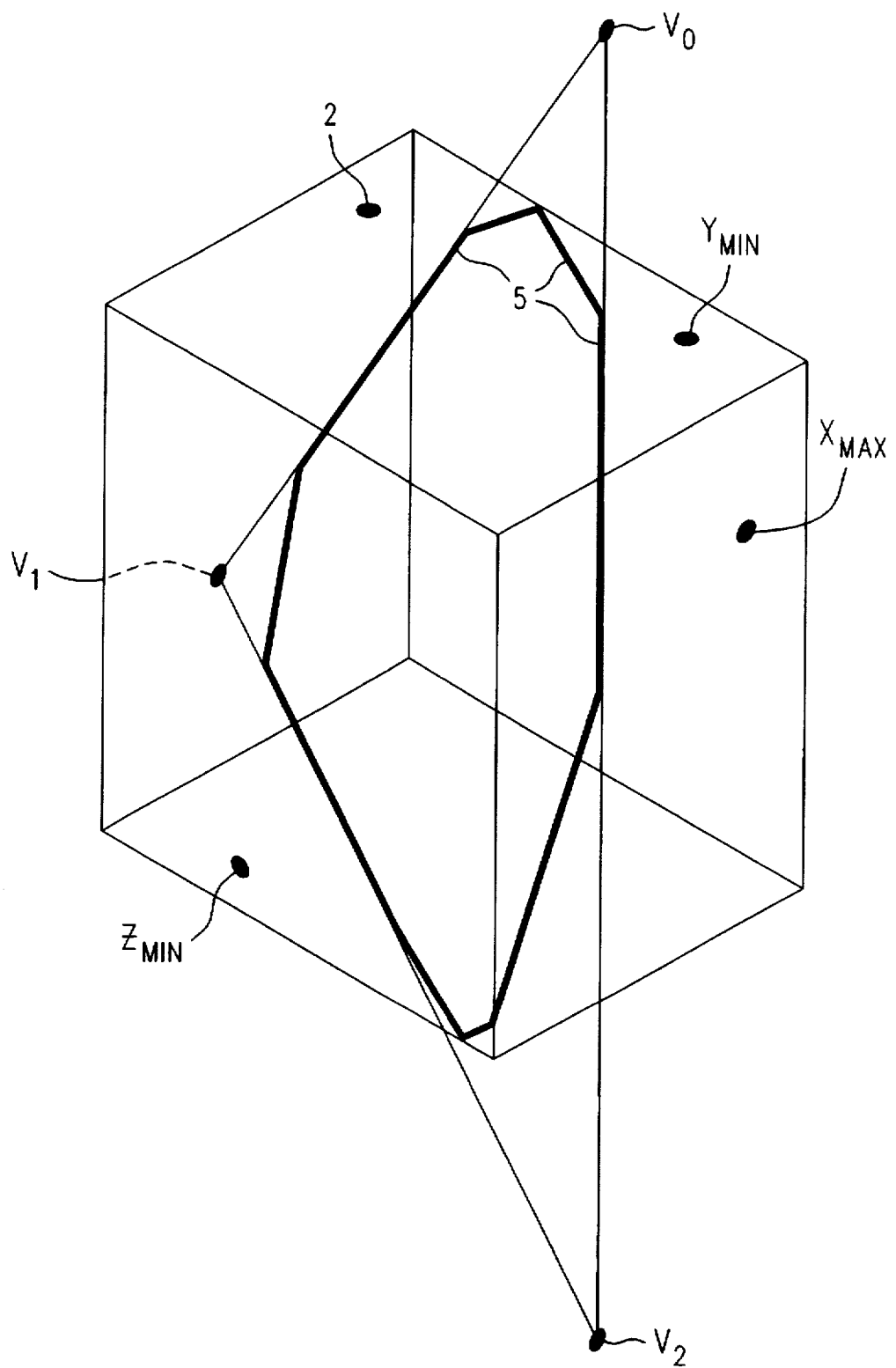
FIG. 3 is a perspective view of the viewing volume of FIG. 1 after the clipping of the triangle primitive and showing the clipped remnant that remains within the viewing volume.

That done, refer now to FIG. 3 and observe the nine sided shape 5 that is the remnant of triangle 1 after clipping. It is denoted by an extra heavy line. The viewing or clipping volume 2 is denoted by a line of medium weight. The light lines extending to the vertices $V_0$, $V_1$ and $V_2$ denote the portions of the triangle that are to be clipped away. We want that nine sided remnant 5, and now approach an explanation of how to get it according to the novel method.

Figure 4:
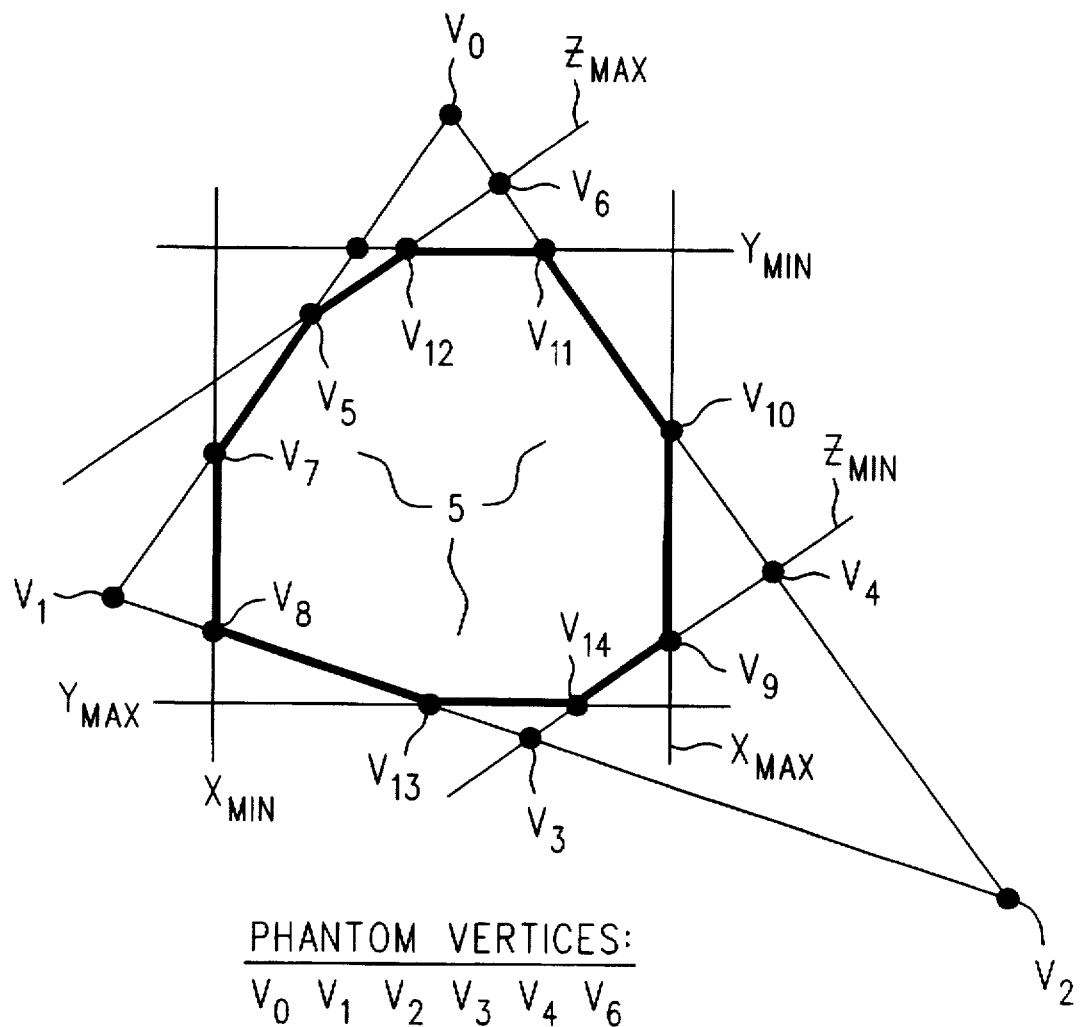
FIG. 4 is a diagram illustrating the remnant of FIG. 3, including the lines of intersection of the remnant with the various clip planes and the resulting phantom vertices.

Refer now to FIG. 4, and note the remnant 5 denoted by the heavy lines. The point of view for this figure is the same (3, 4) as that in FIG. 1, and is now that of you, the reader, as well. The lines denoted as $X_{MIN}$, $X_{MAX}$, $Y_{MIN}$, and $Y_{MAX}$ are actually the end-on views of those four sides of the viewing volume 2. The lines denoted as $Z_{MAX}$ and $Z_{MIN}$ are lines in their respective planes that are intersected by the triangle primitive 1. These latter two planes are, of course, parallel to the plane of the paper upon which the figure is drawn. The remnant 5 is (in this particular case, as well as in general) not normal to the point of view, but is tilted as shown in FIG. 3. Note also that there are six phantom vertices: $V_0$, $V_1$, $V_2$, $V_3$, $V_4$ and $V_6$. These are vertices that are produced by the clipping operation but that are not part of the final remnant 5.

Figure 6:
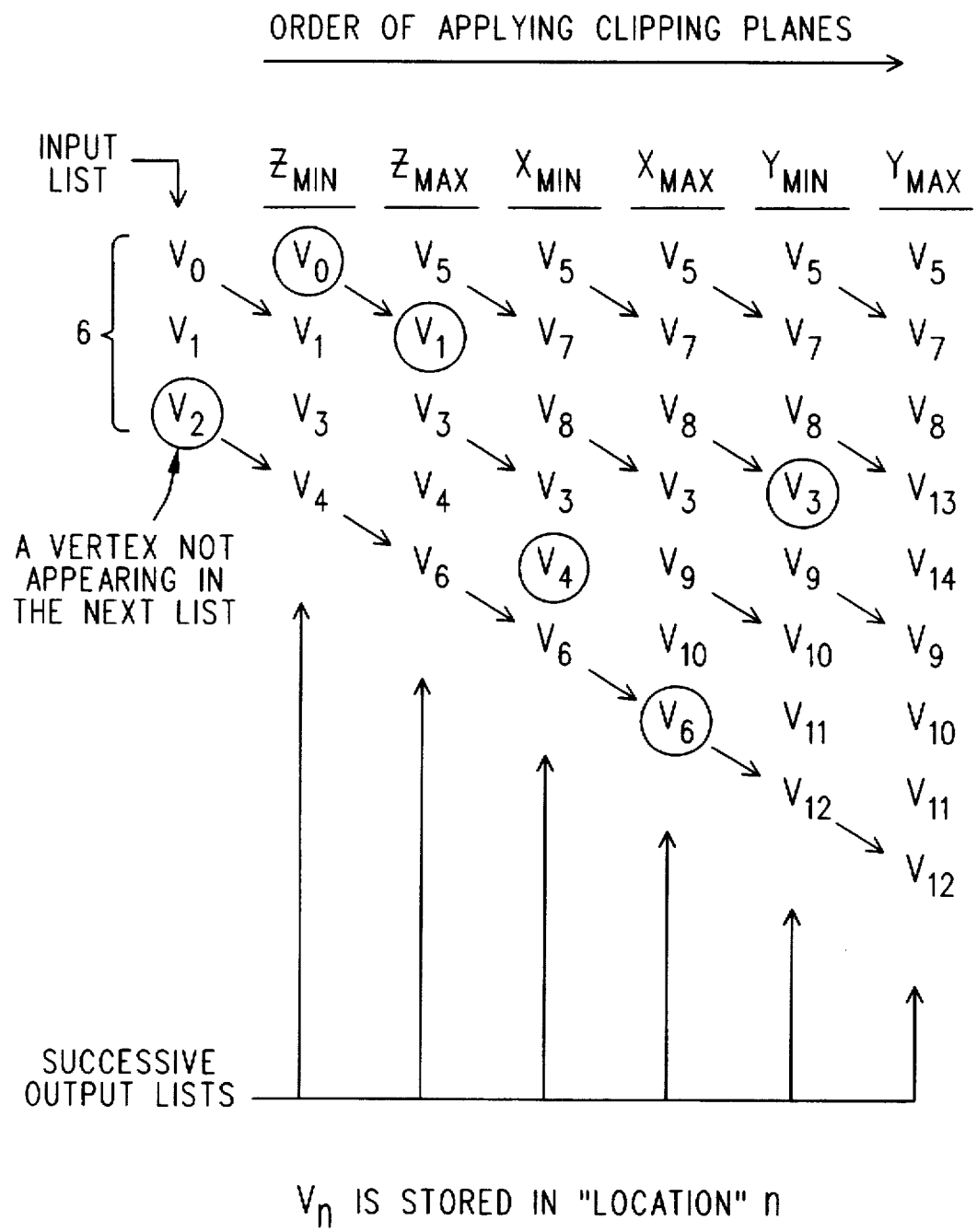
FIG. 6 is a diagram illustrating a prior art method of storing vertex information in registers during the clipping operation that produces the remnant of FIGS. 3 and 4.

As a further aid in appreciating the novel method we shall first briefly describe, with the help of FIGS. 5 and 6, the brute force prior art manner of finding the desired vertices. FIG. 5 is a table of clip codes for the particular triangle 1 of interest. Clip codes are part of the prior art, and may be appreciated by reference to a suitable text on computer graphics. [For example, those readers unfamiliar with the notion of "clip codes" and with the Sutherland and Hodgman reentrant clipping algorithm may find it useful to refer to the discussion of "trivial accept" and "trivial reject" in §4.2.1 in the book *Fundamentals of Interactive Computer Graphics* by J. D. Foley and A. Van Dam (Addison-Wesley, ISBN 0-201-14468-9) and the article Reentrant Polygon Clipping in vol. 17 #1 of *Communications of the ACM* (January 1974, pages 32–42).] A "1" in the table means that the associated vertex will be trimmed away by the clipping operation. It will be understood that the clip codes for the original vertices $V_0$, $V_1$ and $V_2$ are found before beginning to operate on the triangle primitive 1, and that as new vertices are created during clipping their associated clip codes are also found and added to the table in FIG. 5. It will further be appreciated that the information appearing in the table of FIG. 5 is also kept in a collection of registers in hardware that is part of the clipper (not shown), and that each such register is associated with a particular vertex in a pre-existing manner.

Refer now to FIG. 6, wherein is depicted the prior art manner of clipping the example triangle primitive 1 against the viewing volume 2. An input list 6 of initial vertices ($V_0$, $V_1$, and $V_2$) is provided by an external environment. As each clipping plane is considered in turn, an associated output list becomes available. Each output list is essentially a traversable data structure, so that, for example, the output list associated with $X_{MIN}$ can start at $V_5$, go next to $V_7$, go next to $V_8$, go next to $V_3$, and so on. That is, there is some sort of indirect address or link field that is associated with each entry in the output list, and that serves to produce the ordering. This is necessary, since the data for the $n_{th}$ vertex is stored in the $n_{th}$ collection of registers. Thus, the prior art method shown in FIG. 6 consumes fifteen (0–14) collections of registers to represent a closed polygon of only nine vertices. This is so because the prior art method continues to allocate register space for phantom vertices, even though they are not part of the indirect addressing or link field "thread" that orders the entries in the list (the locations for phantom vertices are simply skipped over). This prior art allocation may be seen by examining the final output list for $Y_{MAX}$ while bearing in mind that the data for the $n_{th}$ vertex is stored in the $n_{th}$ collection of registers. Observe that there are only nine entries in the list, but that the highest subscript is 14.

Refer now to FIG. 7, which is to be taken in contrast with FIG. 6. FIG. 7 shows the allocation of register collections for a fixed maximum number (nine) of possible vertices. Each register collection for a vertex has a location, and the final output list for $Y_{MAX}$ uses only the nine locations for location zero through location eight. In the same manner, each intermediate output list of N vertices uses only N register collections at locations zero through N−1. Each output list is ordered to reflect an actual traversal around the edges of the remnant 5.

Although we have not shown it with hardware, the following arrangement will be readily appreciated. Assume that there is a four-bit vertex counter that addresses a small read/write memory of least nine (vertex) locations ($V_0$–$V_8$). The small read/write memory contains a register collection location identifier (address). Thus, as the vertex counter increments from zero to eight the small read/write memory identifies the vertex location in a multiplicity of register collections, there being one collection per vertex, and each collection being a vertex location. There need not be more than nine such vertex locations, but they will get used and re-used in an order that is a function of the triangle primitive and its relation to the viewing volume. The vertex counter is reset and then incremented to a highest presently existing vertex each time a new clipping plane is considered. What is needed, then, is a set of rules that allows the contents of the small read/write memory to be adjusted to produce re-use of a vertex location.

We now identify three rules that allow the re-use of vertex locations. We shall call these Rule #1, Rule #2 and Rule #3. These three rules are explained in conjunction with FIGS. 8, 9 and 10, respectively.

Refer now to FIG. 8, and consider the following Rule #1:

Rule #1: If a previous vertex in the vertex list (n-series of indices) is outside and is not the starting vertex (n=0), then that previous vertex's (physical) vertex location in the vertex list (I, J, X, Y-series indices) can be re-used.

The rationale for Rule #1 is this. Point 7 is found to be outside the viewing volume. Its vertex location (X) can be safely used to represent point 8 as long as point 7 is not $V_0$. (If it were $V_0$ then we would still need it as we finished traversing around the edges of the developing remnant, since it is an end point of the last edge.) By extension, other such previous vertices, such as 7', can also be re-used.

The point 9 for $V_{n+1}$, is shown as being stored in "some free (vertex) location". At this point we don't know what vertex location that is. We can say only that either some other rule is responsible for producing the re-use of some vertex, or that an as yet unused vertex location is put to use.

Refer now to FIG. 9, and consider the following Rule #2:

Rule #2: If the current vertex in the vertex list (n-series of indices) is outside and is the starting vertex (n=0), [i.e., we are clipping the last edge and $V_0$ is outside], then the (physical) vertex location in the vertex list (I, J, X, Y-series indices) containing the data for $V_0$ can be re-used to contain the intersection of that last edge and the clipping plane.

The rationale for Rule #2 is this. Since we are at the end of a traverse of the edges (ending at $V_{\#\ of\ pts-1}$), there is no possibility of a need for a future use of the existing and outside (old) $V_0$ (10) at vertex location I, and the vertex location it is stored in (I) and may be safely re-used as a new $V_{\#\ of\ pts-1}$ (11). The point 12 for the new $V_0$ is shown as being stored in "some free (vertex) location". At this point we don't know what vertex location that is. We can say only that either some other rule is responsible for producing the re-use of some vertex, or that an as yet unused vertex location is put to use.

Refer now to FIG. 10, and consider the following Rule #3:

Rule #3: If the current vertex in the vertex list (n-series of indices) is outside and there has already been an intersection between the clipping plane and another edge, [i.e., the current vertex and all subsequent vertices are outside and will be clipped away], then the (physical) vertex locations in the vertex list (I, J, X, Y-series indices) containing the data for vertices from that current vertex and beyond can be re-used to contain any new vertices.

The rationale for Rule #3 is this. Concave polygons are prohibited. This means that at most two edges of a polygon can intersect a clipping plane. If a first edge that intersects the clipping plane at 13 starts outside, then the second intersection at 14 must be a transition back to outside, and the remaining vertices must likewise be outside, since no further intersections with the clipping plane are possible.

Figure 11:
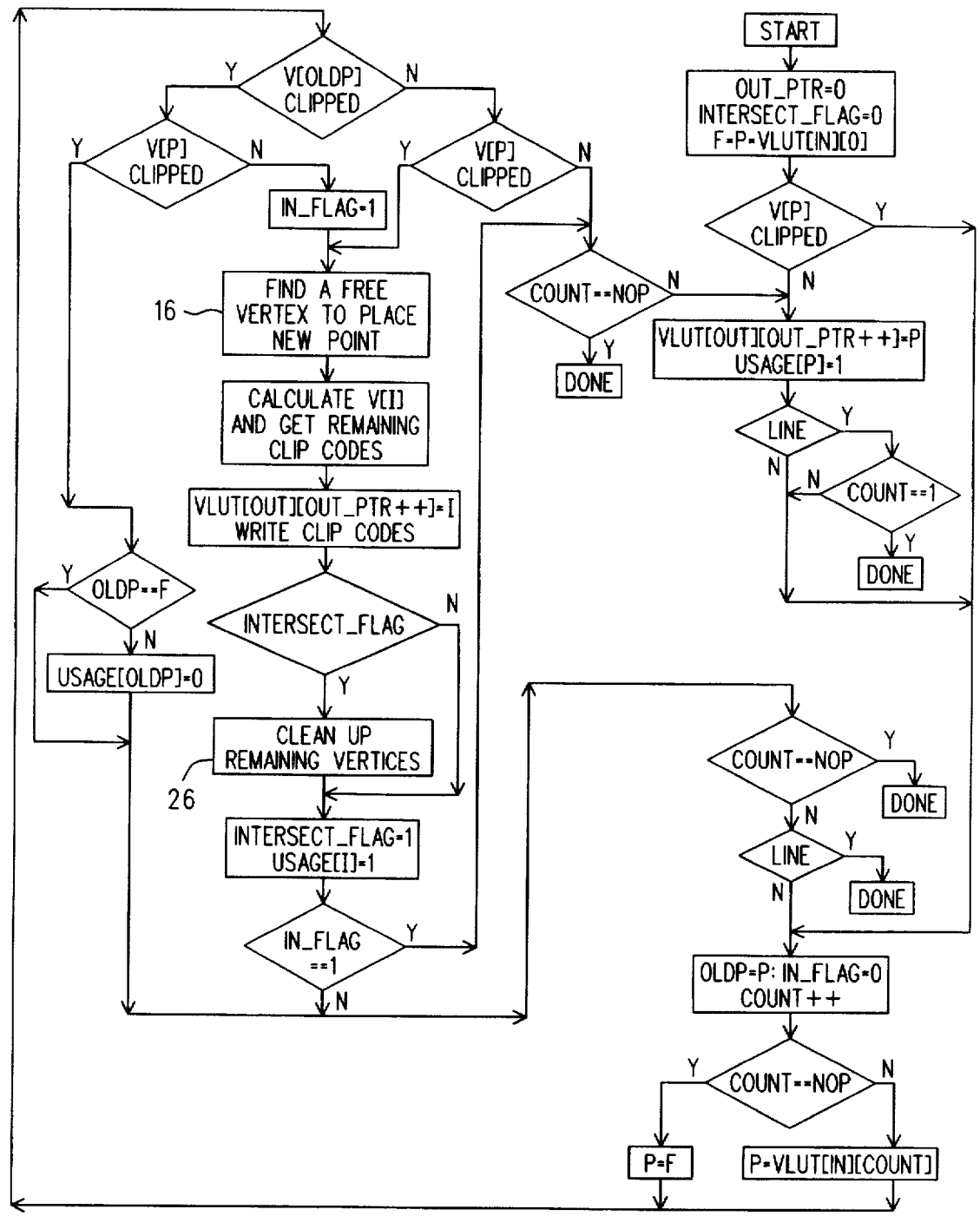
FIG. 11 is a flow diagram describing the operation of a state machine that is used once for each clipping plane to clip a primitive or remnant thereof against that clipping plane.
Figure 12:
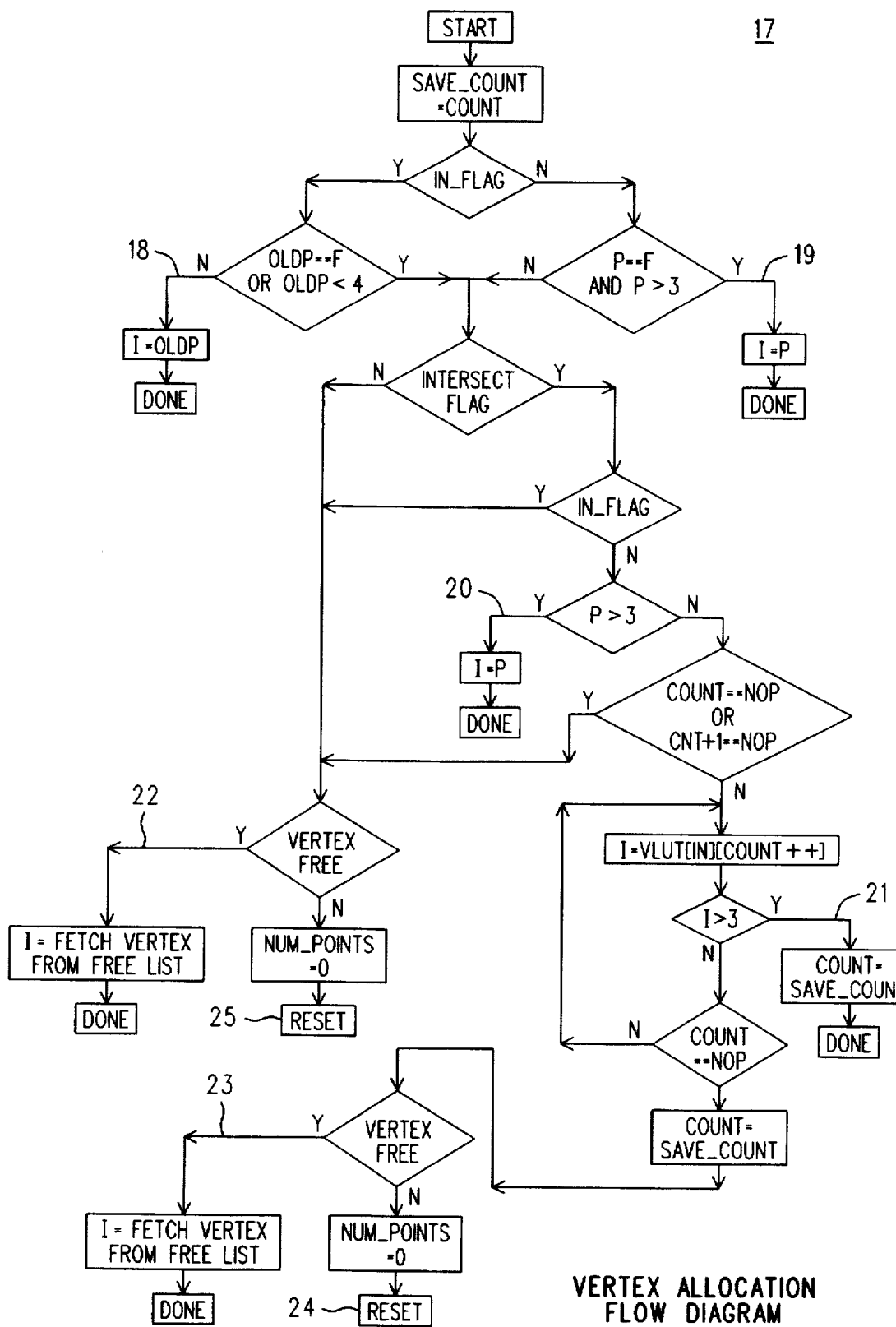
FIG. 12 is a flow diagram describing how the operation of the state machine associated with FIG. 11 implements Rule #1, Rule #2 and Rule #3.
Figure 13:
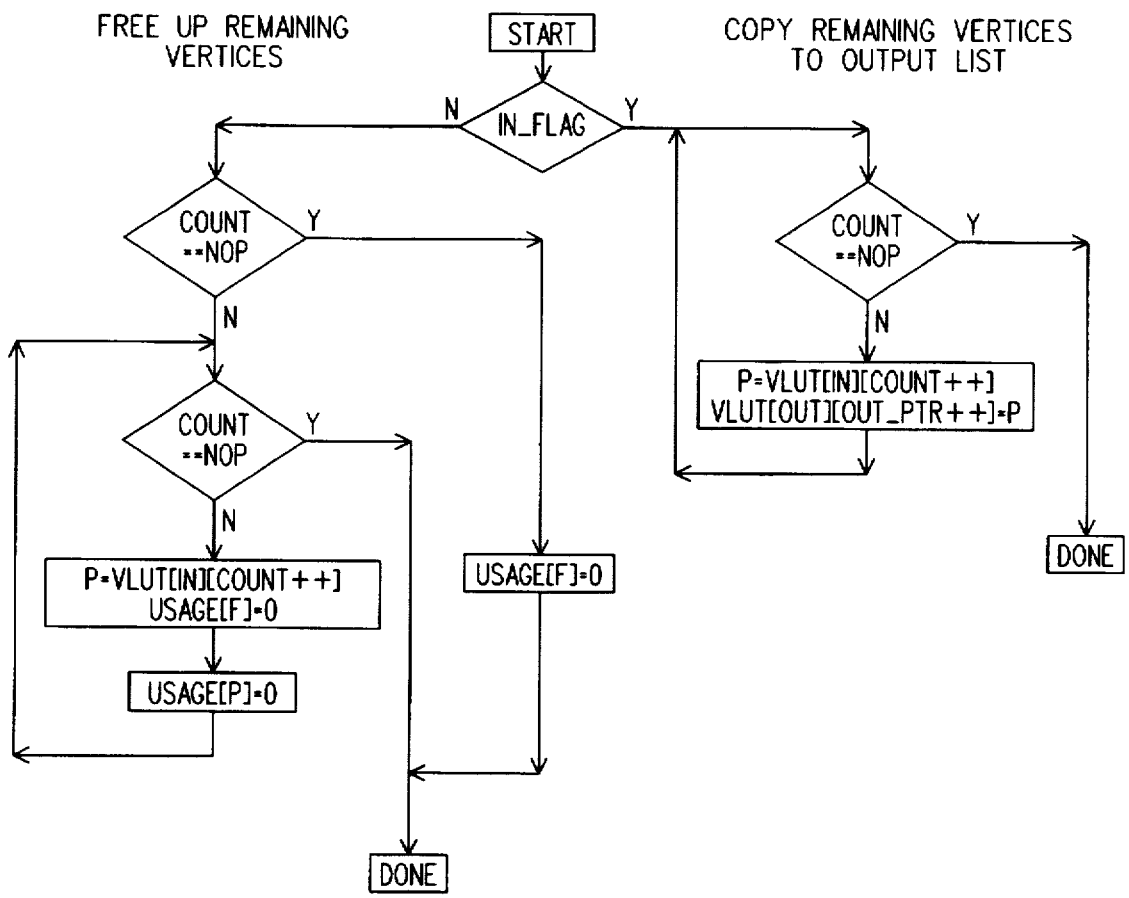
FIG. 13 is a flow diagram describing how the operation of the state machine associated with FIG. 11 performs a multiple vertex recovery operation associated with Rule #3.

Before turning to FIGS. 11–13 and a description of how the three rules are implemented during the clipping of a triangle primitive, we need to address one further consideration. The present graphics system was designed to accommodate users who desire to use quadrilaterals instead of, or in addition to, triangles. To make this possible, quadrilaterals are decomposed into triangles just ahead of the clipping operations described herein. A quadrilateral will have vertices $V_0$–$V_3$. After decomposition the resulting two triangles will share at least two vertices; there is no easy or simple way to predict which two. We can guarantee that the two triangles will be clipped as a consecutive pair, one after the other. However, all four vertices need to be saved until both triangles have been clipped. Where they are saved matters little; register usage is register usage, no matter where it happens. So, the present embodiment enforces an additional rule not yet mentioned. That additional rule is that vertex locations $V_0$–$V_3$ are read only as far as the clipper is concerned. The practical effect of this is to place minor restrictions on Rules #1–#3, in that those physical vertex location cannot be re-used. This increases the number of vertex locations needed in FIG. 7 by four: from $V_0$–$V_8$ to $V_0$–$V_{12}$. If it could be guaranteed that, say, $V_0$ and $V_1$ were always the shared vertices, then the increase owing to protected vertex locations would be three instead of four. (These would be the two shared vertices and the "other" vertex in the triangle not being considered.)

In a graphic system that used two clipping mechanisms of the sort described herein, the extra vertex locations and the read only restrictions would not be needed. In such a system one of each triangle from the decomposition would be sent to each clipper, which would then operate independently. In a similar vein, if there were a pipeline ahead of the clipper that stored triangles to be clipped, then a single instance of the clipper described herein could operate on pairs of triangles that had shared vertices without the extra vertex locations and without the read only restrictions.

The flow diagrams to be described next incorporate the existence of the additional four vertex locations and enforce the read only restrictions for $V_0$–$V_3$. These flow diagrams describe the operation of a collection of state machines that control the operation of the hardware in the clipper. To assist the flow diagrams in dealing with the decomposition of quadrilaterals into triangles, we need to add a little to what we said earlier about the vertex counter and the small read/write memory. There is a decomposition machine that decomposes quadrilaterals into triangles. That decomposition machine also arranges that the small read/write memory points only to those three of the four vertices that describe the triangle (quadrilateral half) that is presently to be clipped. When the other triangle of the quad is to be clipped the small read/write memory will be initialized to point to its vertices. This amounts to providing a four vertex input list of three active vertices and one dormant vertex one time, and a different active three of those same four the next time.

Refer now to FIG. 11, which is an abbreviated flow diagram 15 for the process of clipping a triangle/remnant against a clipping plane. To produce a final remnant the flow diagram of FIG. 11 is invoked six times, once for each plane of the viewing volume. It produces from an input list 6 of vertices an ordered output list; see the output lists in FIG. 7. The flow diagram of FIG. 11 is implemented by a single state machine. In examining the figure the reader will encounter P and OLDP. These refer to the current point (vertex) and the previous point (vertex), respectively. The conventions of the C programming language have been borrowed as an aid in indicating the operations that are carried out in FIG. 11, as well as in FIGS. 12 and 13.

Refer now to FIG. 12, which is a flow diagram 17 expanding the activity represented by step 16 in FIG. 11. Flow diagram 17 of FIG. 12 implements Rule #1, Rule #2 and Rule #3. Although the internal paths sometimes overlap, we can identify various exits that are associated with conditions of interest. Reference numeral 18 identifies the exit taken when Rule #1 has been detected and invoked. (Associated with many of the exits to be discussed in this section is an index I. I represents the vertex location at which the new vertex data will be stored.)

Reference numeral 19 identifies the exit taken when Rule #2 has been detected and invoked. Reference numerals 20 and 21 are both associated with Rule #3. Reference numerals 22 and 23 are both associated with instances where no rule allowed re-use of a vertex, and a "virgin" vertex has to be sacrificed to continue construction of the remnant. Reference numerals 24 and 25 are associated with catastrophic circumstances that are believed to never happen. They are included as a fail safe way to recover gracefully from an instance of insanity by simply discarding the offending primitive.

Refer now to FIG. 13, which is a flow diagram 27 expanding the activity represented by step 26 in FIG. 11. Flow diagram 27 of FIG. 13 cooperates with flow diagram 17 of FIG. 12 to fully implement Rule #3. In short, flow diagram 17 operates to immediately find and re-use a vertex to prevent any possibility of vertex location overrun. However, in the case of Rule #3 there may be multiple vertices that can be recovered for re-use, and these must not be overlooked. Flow diagram 26 of FIG. 13 operates to perform such recovery. (Rule #1 also permits multiple recoveries, but they occur naturally, without the need for FIG. 13.)

Figure 14:
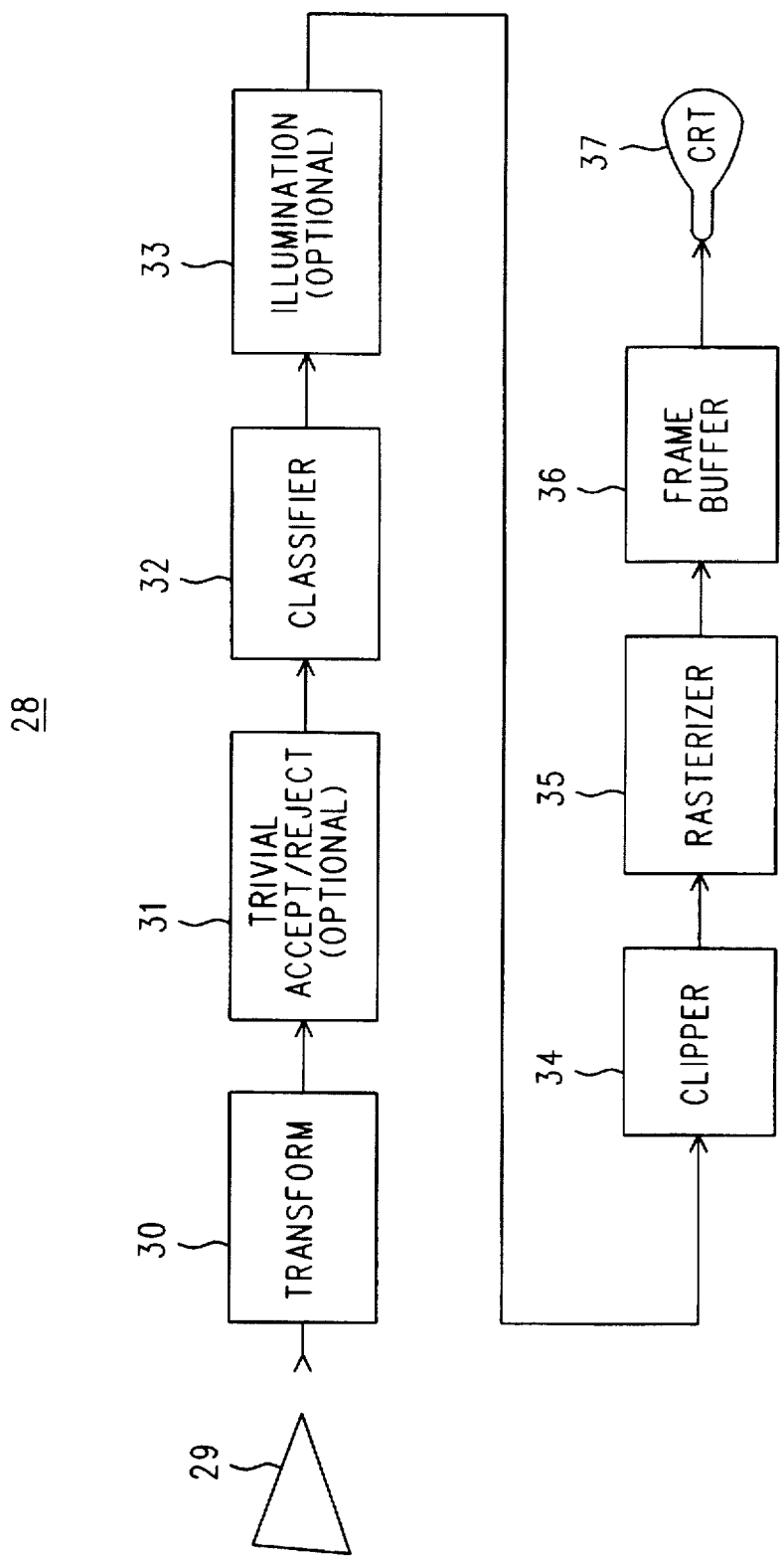
FIG. 14 is simplified hardware block diagram of a portion of an integrated circuit including a clipper incorporating the principles of FIGS. 7–13.

Refer now to FIG. 14, wherein is depicted a simplified block diagram 28 of a hardware arrangement that may be used to clip primitives objects that are processed by a graphics subsystem. A transform mechanism 30 operates on the coordinates of primitive objects to adjust them from one environment to another. A triangle primitive 29 (shown for convenience as a geometric figure, rather than as a list of vertices) is depicted as the next primitive to be processed. The transformed coordinates from the transform mechanism 30 are coupled to a trivial accept/reject mechanism 31 whose task it is to determine (in a known way by examination of the clip codes associated with the primitive at hand) whether or not that primitive needs to be non-trivially clipped. The primitives are next operated upon by a classifier 32, whose input is coupled to the output of the trivial accept/reject mechanism 31. The classifier 32 examines the list of vertices for a primitive and determines if it is a triangle, quadrilateral, etc. It attaches an indication of what it found to that list. Next in the sequence is an optional illumination mechanism 33 that supplements the coordinates of the vertices with data derived from light sources. The output of the illumination mechanism 33 is coupled to a clipper 34.

To continue with FIG. 14, the primitives are next passed to the clipper 34, where those that need clipping receive it. The clipped primitives are then coupled to a rasterizer 35. This mechanism decomposes the clipped remnant into constituent triangles and then supplies from their vertices complete pixel by pixel descriptions of those constituent triangles. The resulting complete pixel level description is then stored in a frame buffer 36 from whence a corresponding image is drawn upon a CRT 37.

In an actual implementation all of the five elements 30–34 are located on one single integrated circuit. And rather than being six totally independent and autonomous mechanisms, they share the various resources on the chip, including, but not limited to, arithmetic units, registers, and controlling state machines. Because of these shared resources and their programmatically controlled use, the actual hardware block diagrams for those six elements are similar to one another, are rather huge, and do not particularly reveal their ultimate purpose. Instead of attempting to describe all that in gruesome detail, we shall for now simply note that it is a large collection of shared resources, all interconnected by suitable busses, and instead rely upon the discussions of the flow diagrams of FIGS. 11–13 for an appreciation of the actions produced by the controlling state machines in the integrated circuit. After that it will be feasible to take a more detailed look at just a portion of the clipper 34, in isolation.

Figure 15:
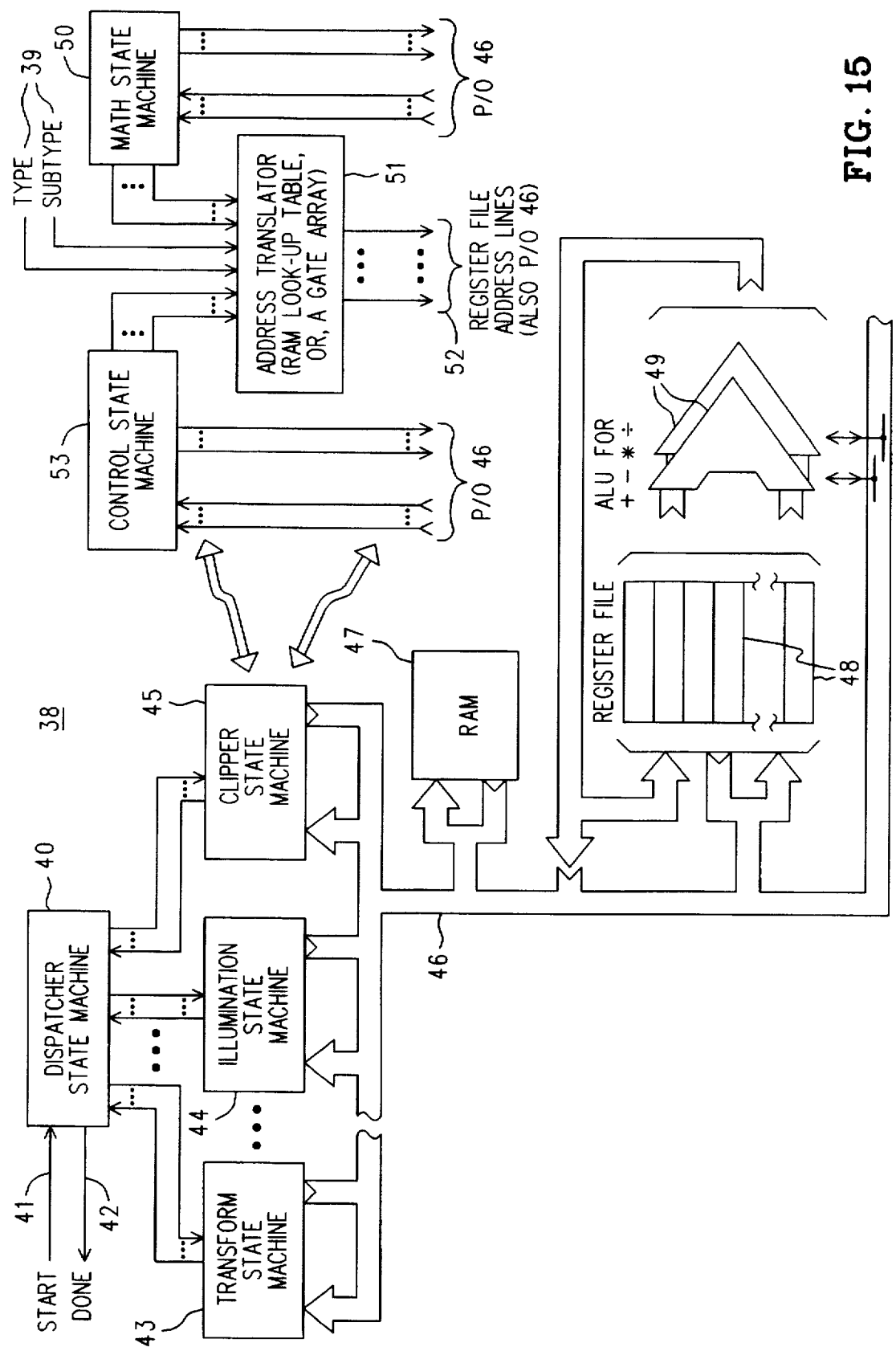
FIG. 15 is a more detailed yet still simplified block diagram of both FIG. 14 and the clipper portion therein.

Refer now to FIG. 15, which is a more detailed, yet still simplified, expanded block diagram 38 of the block diagram 28 of FIG. 14, with special emphasis on those portions of that block diagram that are for the clipper 34. As shown in FIG. 15, a dispatcher state machine 40 is responsive to a START signal 41 by starting and stopping in an appropriate sequence various other state machines that perform particular functions or operations upon primitive objects. These other state machines include (and the figure does not show, nor do we mention, all such state machines) a transform state machine 43, an illumination state machine 44, and (the one of greatest interest here), a clipper state machine 45. When all this lot has done what it is supposed to do on a primitive object, the dispatcher state machine 40 issues a DONE signal 42.

To continue at this same level of abstraction, a bus 46 (which is actually a rather substantial collection of busses and control lines) conveys instructions, data and status information among the aforementioned state machines 43, 44 and 45, as well as to and amongst other resources. These additional resources include RAM 47, a register file 48 and an ALU 49. RAM 47 is, in a preferred embodiment, a genuine 320 by 32-bit addressable random access memory architecture. It is in this memory that lists of vertices and their associated coordinates are stored as appropriate data structures. The register file 48 is a collection of sixty-four by 32-bit addressable registers. Reads and writes for these registers occur using any of six ports. (Think: six separate but otherwise identical busses, each including their associated read and write control lines.) This arrangement supports simultaneous reading and writing to pluralities of registers. These registers are used primarily in conjunction with the ALU 49 and other arithmetic resources to perform computations. For example, the transform state machine 43 and the clipper state machine (p/o 45) each need substantial arithmetic services. Register file 48 and ALU 49 provide them.

FIG. 15 also contains a simplified expansion of what is in the box 45 labelled clipper state machine. The expansion includes a control state machine 53 that keeps track of whether a bow-tie related process or a clipper related process is being done. (A bow-tie is a quadrilateral that is twisted, so that it intersects itself. Except for brief mention, we have, for the sake of brevity and the proper scope of our present interest, suppressed most of the bow-tie stuff, which would otherwise be part of the clipper 34.) A math state machine 50 oversees a repertoire of arithmetic services, many of which might be needed for both the bow-tie process and the clipping process. State machines 50 and 53 can interact via communication over bus 46.

As shown in this part of the figure, state machines 50 and 53 also are coupled to an address translator 51. What is coupled are register addresses destined for use with operations on register file 48. In particular, they are the register addresses that would appear according to one of several bow-tie situations, one of which we may construe as "no bow-tie". The address translator 51 also receives the actual Type and Subtype 39 for an evil bow-tie that needs to be decomposed into two triangles. What the address translator 51 does is trade various register addresses for those corresponding to the other cases, during those respective times when those different cases exist. The nature of that trading need not further concern us in this disclosure. The address translator 51 could be implemented as a RAM-based lookup table, but in a preferred embodiment is made from a gate array, as that is significantly faster.

Figure 16:
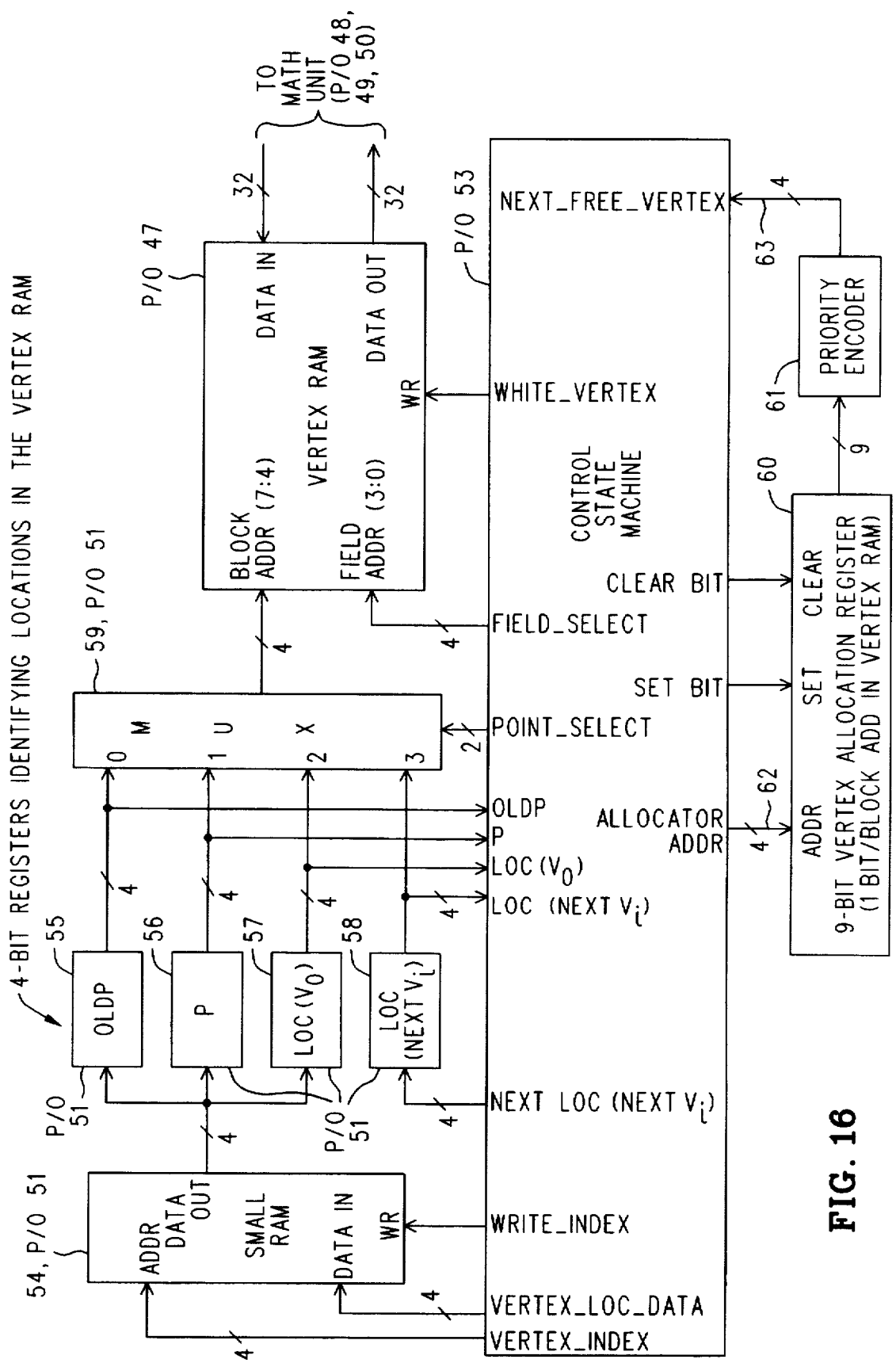
FIG. 16 is a more detailed yet still simplified block diagram of a portion of the clipper in FIGS. 14 and 15.

Refer now to FIG. 16, wherein is shown a block diagram of a portion of the clipper 34 of FIG. 14 and of the clipper-related portions of FIG. 15. To begin our discussion we shall point out the major functions of certain of the elements. It will be clear that we have already encountered several of them. First, the small RAM 54 (which is part of 51 in FIG. 15) is what we earlier called the small read/write memory in connection with the discussion of FIG. 7 and the output vertex list. The vertex RAM (p/o 47 in FIG. 15) is what contains the various register collections that are used to store vertex data. The vertex RAM is addressable by a four-bit block address that identifies the per vertex collection of registers, and by a 4-bit field address the identifies the various components of a vertex (e.g., X, Y, Z, R, G, B, etc.)

Also of particular interest in FIG. 16 is the 9-bit vertex allocation register 60. This mechanism has a bit set for every allocated block address in the vertex RAM (i.e., those that contains a vertex). It has a cleared bit for those blocks that are available for new vertices. As block addresses are allocated and freed (used and re-used) the bits in the vertex allocation register 60 are kept up-to-date. A priority encoder 61 produces from the 0's in the bit pattern of the vertex allocation register 60 a binary number that is an address for the lowest unallocated block in the vertex RAM. As part of this process the control state machine enforces the write protection of the first four block address (for $V_0$–$V_3$) by subtracting four from the allocator address 62 and by adding four to the priority encoder's output next__free__vertex 63.

The various 4-bit registers OLDP 55, P 56, LOC($V_0$) 57 and LOC(NEXT $V_i$) 58 (all p/o 51 in FIG. 15) cooperate with the MUX 59 under the control of the control state machine 53 to enforce Rules #1–#3 and to perform the various clipping operations.

We claim:

1. A method of re-using a vertex location that stores vertex data for a phantom vertex during the clipping of a polygon against a clipping plane, the method comprising the steps of:
   (a) maintaining in a collection of vertex locations an ordered list of vertices describing the polygon prior to clipping;
   (b) traversing the ordered list of vertices to visit each vertex location having stored vertex data, beginning with a starting vertex;
   (c) determining for each vertex in the ordered list thereof if that vertex is beyond the clipping plane; and
   (d) if a previously visited vertex location contains a vertex that is beyond the clipping plane and that is not the starting vertex, then assigning that previously visited vertex location to a collection of vertex locations that are used to store vertex data for newly found vertices.

2. A method of re-using a vertex location that stores vertex data for a phantom vertex during the clipping of a polygon against a clipping plane, the method comprising the steps of:
   (a) maintaining in a collection of vertex locations an ordered list of vertices describing the polygon prior to clipping;
   (b) traversing the ordered list of vertices to visit each vertex location having stored vertex data, beginning with a starting vertex;
   (c) determining for each vertex in the ordered list thereof if that vertex is beyond the clipping plane; and
   (d) if a currently visited vertex location contains a vertex that is beyond the clipping plane and is also a re-visitation of the starting vertex, then re-using that currently visited vertex location to store newly found vertex data in place of the vertex data for the starting vertex.

3. A method of re-using a vertex location that stores vertex data for a phantom vertex during the clipping of a polygon against a clipping plane, the method comprising the steps of:
   (a) maintaining in a collection of vertex locations an ordered list of vertices describing the polygon prior to clipping;
   (b) traversing the ordered list of vertices to visit each vertex location having stored vertex data, beginning with a starting vertex;
   (c) determining for each vertex in the ordered list thereof if that vertex is beyond the clipping plane; and
   (d) if the currently visited vertex location contains a vertex that is beyond the clipping plane and there has already been an intersection with the clipping plane in connection with a previously visited vertex location, then assigning that currently visited vertex location and those beyond it in the ordered list of vertices to a collection of vertex locations that are used to store vertex data for newly found vertices.

4. A method of clipping a non-concave polygon comprising the steps of:
   (a) maintaining in a collection of vertex locations an ordered list of vertices describing the polygon prior to clipping;
   (b) traversing the ordered list of vertices to visit each vertex location having stored vertex data, beginning with a starting vertex;
   (c) determining for each vertex in the ordered list thereof if that vertex is to be clipped away;
   (d) computing new vertex data to replace that of the vertices that have been clipped away; and
   (e) storing the new vertex data in vertex locations that correspond to vertices that have been clipped away.

* * * * *